United States Patent
Bradford

[11] 3,881,700
[45] May 6, 1975

[54] WATER TREATMENT PLANT
[76] Inventor: Bert C. Bradford, Society St., St. George, S.C. 29477
[22] Filed: Nov. 8, 1973
[21] Appl. No.: 413,859

[52] U.S. Cl.................................. 259/4; 210/207
[51] Int. Cl.............................................. B01f 15/02
[58] Field of Search............ 210/84, 207, 208, 220, 210/247, 255, 256, 519, 521; 259/4, 18, 36

[56] References Cited
UNITED STATES PATENTS

| | | | |
|---|---|---|---|
| 973,357 | 10/1910 | Lewis et al.......................... | 210/519 |
| 1,104,051 | 7/1914 | Kropp................................. | 210/519 |
| 1,343,764 | 6/1920 | Clifford.............................. | 210/519 |
| 1,490,794 | 4/1924 | Alexander........................... | 210/84 |
| 1,574,170 | 2/1926 | Rosenau ............................ | 210/519 X |
| 2,624,463 | 1/1953 | Freese................................ | 210/519 |
| 3,482,694 | 12/1969 | Rice et al........................... | 210/84 X |
| 3,788,476 | 1/1974 | Othmer............................... | 210/208 X |
| 3,799,346 | 3/1974 | Freese................................ | 210/207 X |

Primary Examiner—Samih N. Zaharna
Assistant Examiner—Robert G. Mukai
Attorney, Agent, or Firm—Bailey & Dority

[57] ABSTRACT

A water treatment plant which insures the mixture of chemicals with water and subsequent aeration of the water for aiding in purifying the water. The device includes a vertical tank which has a hood carried therein. The solution of raw water and chemicals enter the top of the tank into the hood and collide with a cup-shaped deflector. The cup-shaped deflector reverses the flow of the water with great turbulence and forces the water and chemical solution up into a mixing chamber defined by the upper portion of the hood. The solution then flows down under the bottom of the hood upwards in the tank. Intermediate the top and bottom of the tank is a floc layer which aids in removing impurities from the solution. The solution is then aerated by passing through a launder and a collection well. Subsequent filtration can take place if desired.

5 Claims, 4 Drawing Figures

WATER TREATMENT PLANT

BACKGROUND OF THE INVENTION

This invention relates to a water plant and more particularly to an apparatus for mixing chemicals with raw water to purify the water.

As a result of the heavy use of water by industry as well as the heavy consumption by large metropolitan areas, a shortage is being created in certain parts of the United States. This problem is also encountered in areas where drinkable water is not abundant in the natural state as a result of impurities contained therein. While normally there is a great supply of water, a substantial amount of this water contains bacteria and impurities. For example, many industries after utilizing the water, deposit the water in settling ponds and the like for subsequent disposal in rivers. While these settling ponds remove a substantial amount of the impurities from the water the water is generally not sufficiently pure for human consumption. Water plants have been developed for reclaiming this water; however, normally such plants are relatively large and expensive.

SUMMARY OF THE INVENTION

The subject invention comprises a water plant which can be constructed in various sizes for processing various volumes of water. These plants are relatively simple and maintenance free in operation. The plants include a cylindrical, upright vertical tank which has a side wall with a top and bottom thereon. A conduit is used for supplying the raw water into the top of the tank. As the raw water is supplied to the tank, chemicals are injected by a conventional chemical injection pump into the stream of the raw water. A hood is carried within the vertical tank and has an upper substantially cylindrical mixing chamber with diverging walls extending downwardly therefrom to adjacent the bottom of the tank. The bottom of the diverging walls are spaced from the sides of the tank as well as the bottom of the tank for permitting the solution to flow under the hood back up into the tank. A cup-shaped member having a bottom and upwardly extending walls is carried in the cylindrical upper portion of the hood. The solution of raw water and chemicals enter through the top of the tank into the hood and collides with the cup-shaped member. The cup-shaped member reverses the downwardly flow of the solution with great turbulence forcing the solution up into the mixing chamber. On reaching the top of the mixing chamber, the solution again reverses its direction of flow and is forced to flow back downwardly towards the bottom of the hood. This action aids in mixing and dissolving all of the chemicals left in the water and completes the formation of floc.

From the mixing chamber, the floc-laden solution flows down collecting the solids and impurities in the water. On passing under the skirt of the hood, the water passes through a floc blanket or layer that is formed when chemicals are used to clean and purify water. Here the solids and impurities are deposited in the floc blanket. The solution continues in an upward direction, where the floc particles collide and combine; becoming too heavy to float they fall down into the floc blanket. The level of the water rises in the tank until such reaches a launder where the clean water is collected and dropped into a collection well. The launder and collection well aerate the water.

In some systems, after the purified water leaves the collection well, such is fed by means of a filter pump through a rapid sand filter system into a storage tank or a distribution system.

Accordingly, it is the general object of the present invention to provide an apparatus for mixing a solution of raw water with chemicals so as to produce a more purified mixture.

Another important object of the present invention is to provide an apparatus wherein a solution of raw water and chemicals are turbulently mixed within a mixing chamber carried within a tank.

Another important object of the present invention is to provide a simple and relatively inexpensive structure for removing impurities from raw water with the use of chemicals.

These and other objects and advantages of the invention will become apparent upon reference to the following specifications, attendant claims and drawings.

DESCRIPTION OF THE PREFERRED EMBODIMENT

Figure 1:
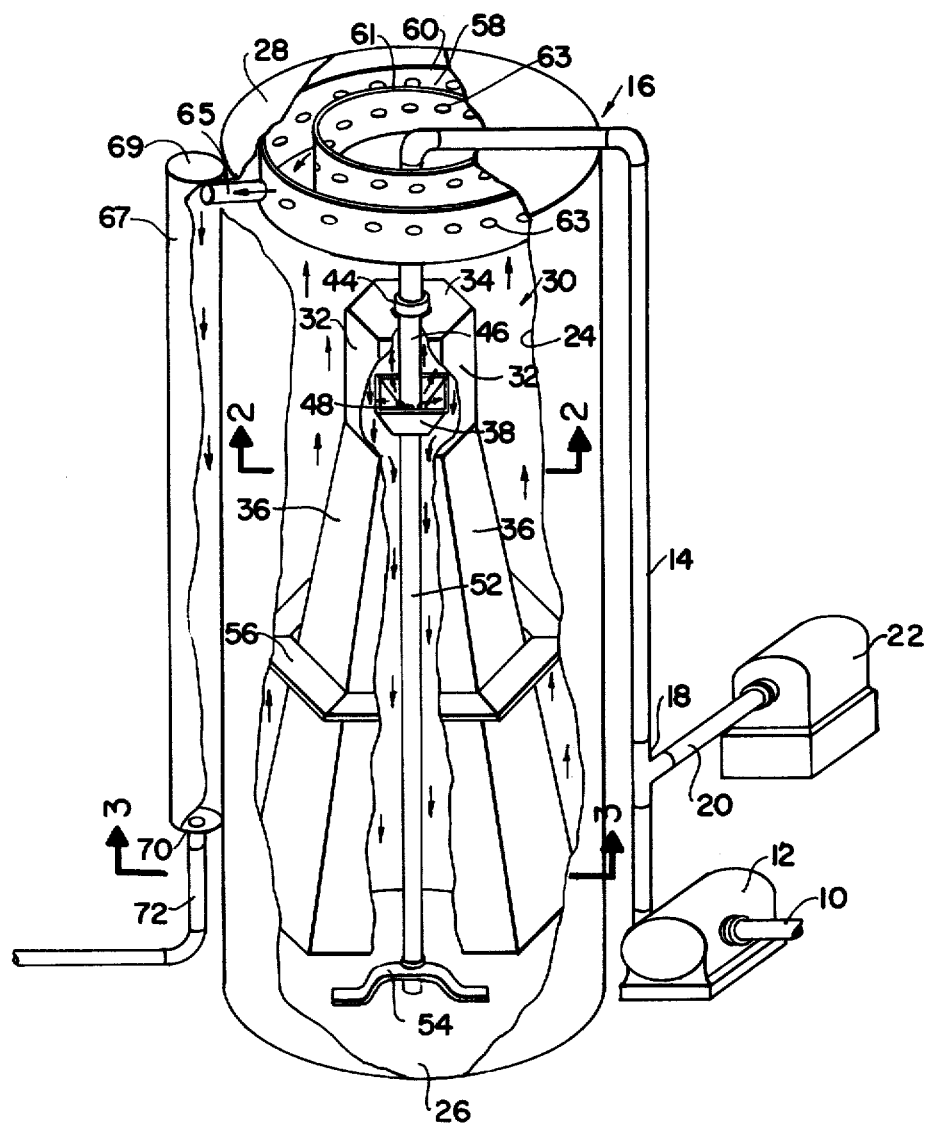
FIG. 1 is a perspective view with parts broken away for purposes of clarity illustrating an apparatus constructed in accordance with the present invention for insuring mixing of raw water with chemicals.
Figure 2:
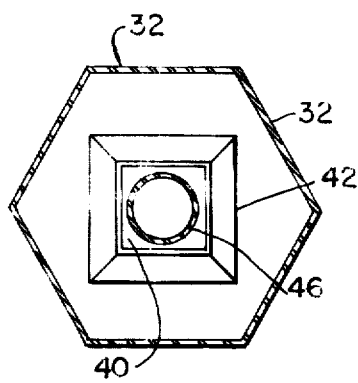
FIG. 2 is a sectional view taken along line 2—2 of FIG. 1.
Figure 4:
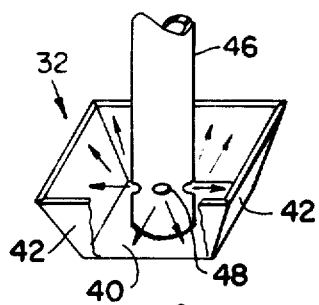
FIG. 4 is an enlarged perspective view with parts broken away illustrating a cup-shaped member utilizing in a mixing chamber for insuring mixing of chemicals with water.
Figure 3:
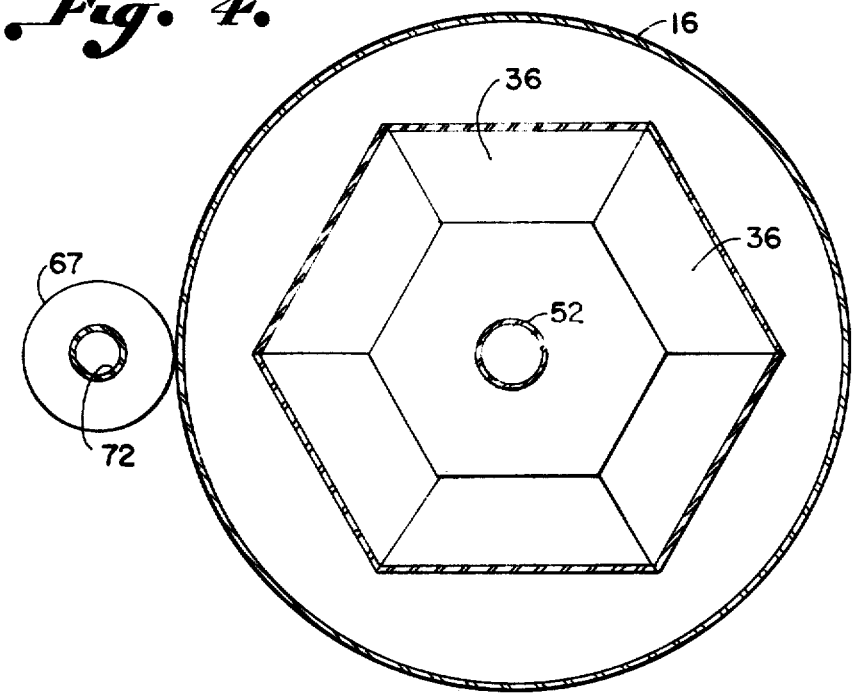
FIG. 3 is a sectional view taken along line 3—3 of FIG. 1.

Referring in more detail to FIG. 1 of the drawings there is illustrated a conduit 10 which may be connected to any suitable source of raw water such as a pond, lake or river. This conduit 10 is coupled to one side of an electrical pump 12 which pressurizes the water and feeds such out through a conduit 14 that extends into the top of a vertically standing cylindrical tank 16. The conduit 14 has a T connection 18 interposed therein to which is coupled a conduit 20 leading from a chemical pump and supply 22. The chemical pump and supply 22 may be any suitable conventional chemical pump provided for injecting chemicals into a pressurized stream of water.

The tank 16 is cylindrical in shape and includes a side wall 24 having a bottom 26 and a top 28 provided thereon. The top 28 has an opening therein through which the conduit 14 extends which is larger than the diameter of the conduit so as to permit air to flow into the tank 16. The tank may be constructed of any suitable material such as stainless steel, plastic or sheet metal that does not react with the chemicals when combined with the water.

A hexagonally shaped hood generally designated by the reference character 30 is carried within the tank and may be constructed of any suitable material such as sheet metal. The upper portion of the hood has six vertical side walls 32 which are joined by a top 34 to define a mixing chamber. The bottom of the side walls 32 are joined by diverging side walls 36 which terminate above the bottom 26 of the tank so as to permit passage of the solution under the skirt defined by the diverging side walls 36 up into the tank. While the hood 30 is shown to be hexagonal in shape it is to be understood that the upper portion could be cylindrical with the lower portion being frustro-conical in shape.

A cup-shaped member 38 is carried within the upper portion of the hood for deflecting water upwardly into the upper portion which constitutes a mixing chamber. The cup-shaped member has a square bottom 40 with side walls 42 extending upwardly therefrom at an angle approximately 45 degrees. For best results, the angle of the side wall should extend upwardly and outwardly at an angle between 45 degrees and 60 degrees.

The conduit 14 extends through a hole, not shown, provided in the top 28 of the tank down to a threaded pipe coupling 44 which is welded to the top of the hood 34. A hole is provided in the top of the hood 34 for permitting the passage of a vertical conduit 46 which is threaded into the coupling 44. Adjacent the bottom of the conduit 46 are holes 48 which permit the solution to be expelled from the conduit 46 adjacent the bottom of the cup-shaped member 38. The lower portion of the conduit 46 is welded to the bottom 40 of the cup-shaped member 32. The cup-shaped member 32 is supported on a vertical pipe 52 which is welded to the lower side of the bottom 40 of the cup 32. The pipe 52 is, in turn, supported on a bracket 54 which is suitably secured to the bottom 26 of the tank by welding or bolting.

.The chemicals carried within the solution into the tank through the conduit 14 causes formation of floc. This floc-laden water flows down under the bottom skirt of the hood 30 creating a floc blanket or layer intermediate the top and bottom of the tank. Normally, this floc layer is formed in the lower portion of the tank below a baffle 56 which extends around the outside of the diverging side walls 36. The purpose of the baffle 56 which is defined by outwardly extending flanges that are secured to the side walls 36 by brackets, not shown, is to slow down the flow of solution as such passes from under the skirt of the hood 30 upwards into the tank so as to permit proper action between the floc blanket and the solution passing therethrough for separating impurities from the solution. Since the floc layer extends throughout the tank both on the inside and outside portions of the hood 30 such enables the solution under treatment to pass through the floc layer twice. As previously mentioned, the floc layer removes solid impurities from the solution being treated while the chemicals combined with the solution destroys the bacteria contained therein. An overflow in the form of a launder 58 is supported adjacent the top of the tank by any suitable means, not shown for removing the solution from the tank 16 when the level reaches the top of the tank. The launder includes a pair of concentric side walls 60 and 61 joined by a bottom wall. The side walls 60 and 61 have holes 63 provided therein through which the water passes and drops onto the bottom of the launder. As the water flows through the holes 63, such is aerated ensuring proper action between the chemical and the impurities carried therein. A drain conduit 65 is coupled to the bottom of the launder for transporting the water from the launder 58 to the upper end of a cylindrical collection well 67. The collection well 67 is cylindrical in shape and has a top 69 and a bottom 70 positioned thereon. The collection well extends along the side of the tank 16. The solution is allowed to drop downwardly through the collection well and exit out of a conduit 72 communicating with the bottom 70 of the collection well. The purpose of the collection well is to further aerate the solution. The conduit 72 may be coupled to a rapid sand filtering system if additional cleansing is desired. In some circumstances it is not necessary to send the purified water through the additional sand filtering system; however, to be certain that all impurities have been removed from the solution prior to introducing the rejuvenated water into a distribution system, it is desirable to provide an additional filtration. From the filtration system, the water is either fed into a storage tank or fed directly to a distribution system.

In one particular apparatus, the diameter of the mixing chamber defined by the six hexagonal walls 32 is 18 inches and the depth of the mixing chamber is 12 inches. The width of the cup adjacent the top is 6 inches while the width of the bottom of the cup is 3 inches. It has been found that the depth of the cup should be three times the diameter of the delivery pipe 46 so as to confine the water within the cup 38 to produce sufficient turbulence. Many different types of conventional chemicals can be utilized in the purification and it has been found that aluminum sulphate in combination with liquid lime and calcium chloride operate satisfactorily.

While a preferred embodiment of the invention has been described using specific terms, such description is for illustrative purposes only, and it is to be understood that changes and variations may be made without departing from the spirit or scope of the following claims.

What is claimed is:

1. An apparatus for ensuring mixing of a solution of water with chemicals to produce a more purified mixture comprising: a cylindrical upright vertical tank having a side wall with a top and bottom thereon; a conduit extending through the top of said tank conveying said solution to said tank; a hood carried within said vertical tank; said hood having an upper portion with diverging walls extending downwardly from the bottom of said upper portion; said diverging walls terminating adjacent and above the bottom of said tank with the bottom of said diverging walls being spaced from said side wall of said tank; a cup-shaped member carried in said upper portion of said hood having a bottom and walls extending upwardly therefrom; said conduit terminating in said cup-shaped member, holes provided in said conduit adjacent said bottom of said cup-shaped member for discharging said solution into said cup-shaped member to collide with said cup-shaped member for reversing the direction of flow of said solution creating water turbulence in said upper portion of said hood; whereby additional mixing of said chemical and water takes place in said hood form producing a more purified mixture.

2. The apparatus as set forth in claim 1 further comprising: an overflow carried adjacent said top of said tank for draining said solution from adjacent the top of said tank after the level of said solution reaches a predetermined height in said tank so as to permit a floc layer to form in said tank intermediate the top and bottom of said tank.

3. The apparatus as set forth in claim 1 further comprising: pump means coupled to said conduit for pressurizing said solution so that pressurized agitation of said solution takes place as said solution is discharged into said cup-shaped member.

4. The apparatus as set forth in claim 2 further comprising: a baffle surrounding the outer wall of said hood for impeding the flow of solution as said solution flows under the bottom of said hood and upwardly within said tank so as to obtain maximum action between said floc layer and said solution passing therethrough.

5. The apparatus as set forth in claim 2 wherein said overflow includes: a launder including a pair of spaced concentric side walls joined by a bottom; an outlet conduit communicating with said launder adjacent the bottom thereof for discharging said solution from said launder out of said tank, and holes provided in said side walls above said outlet conduit for permitting said solution to be aerated as said solution flows through said holes into said launder.

* * * * *